United States Patent [19]

Sasaki et al.

[11] Patent Number: 4,682,216
[45] Date of Patent: Jul. 21, 1987

[54] COLOR IMAGE PICTURE FORMING PROCESS AND APPARATUS WHICH IMPROVES THE QUALITY OF THE BLACK PORTIONS OF THE PICTURE

[75] Inventors: Takashi Sasaki, Tokyo; Nobuaki Sakurada, Yokohama; Hideaki Kawamura, Tokyo; Jiro Moriyama, Kawasaki, all of Japan

[73] Assignee: Canon Kabushiki Kaisha, Tokyo, Japan

[21] Appl. No.: 585,234

[22] Filed: Mar. 1, 1984

[30] Foreign Application Priority Data

| Mar. 8, 1983 | [JP] | Japan | 58-37696 |
| Mar. 8, 1983 | [JP] | Japan | 58-37697 |
| Mar. 8, 1983 | [JP] | Japan | 58-37699 |
| Jan. 18, 1984 | [JP] | Japan | 59-6930 |

[51] Int. Cl.⁴ .......... G03F 3/08; H04N 1/40; H04N 1/46; G01D 15/16
[52] U.S. Cl. .......... 358/79; 358/75; 358/80; 358/284; 358/296; 346/140 R
[58] Field of Search .......... 358/75, 78, 79, 80, 358/256, 280, 283, 284, 298, 296; 346/140 R, 140 IJ, 140 PD, 140 A, 75; 101/211

[56] References Cited

U.S. PATENT DOCUMENTS

| 3,109,884 | 11/1963 | Zeyen | 358/79 |
| 4,217,822 | 8/1980 | Milligan | 101/211 |
| 4,245,258 | 1/1981 | Holladay | 358/283 |
| 4,412,226 | 10/1983 | Yoshida | 346/75 |
| 4,413,275 | 11/1983 | Horiuchi et al. | 358/75 |
| 4,446,470 | 5/1984 | Sugiyama et al. | 358/75 |
| 4,560,997 | 12/1985 | Sato et al. | 358/298 |
| 4,614,967 | 9/1986 | Sayanagi | 358/75 |
| 4,631,578 | 12/1986 | Sasaki et al. | 358/80 |

FOREIGN PATENT DOCUMENTS 34276  4/1981  Japan .................. 358/280

Primary Examiner—James J. Groody
Assistant Examiner—Randall S. Svihla
Attorney, Agent, or Firm—Fitzpatrick, Cella, Harper & Scinto

[57] ABSTRACT

Color image picture forming process and apparatus can provide a picture with smooth shadow portions without false contours. When a black component of a color picture data is smaller than a predetermined value, the black component is expressed by using the combination of cyan, magenta and yellow colorants. When the black component is larger than the predetermined value, it is expressed by alternately using the black colorant and the three colorant combination. In another embodiment, picture quality can be enhanced by using a black colorant having a higher density than the cyan, magenta and yellow colorants.

50 Claims, 15 Drawing Figures

FIG.4
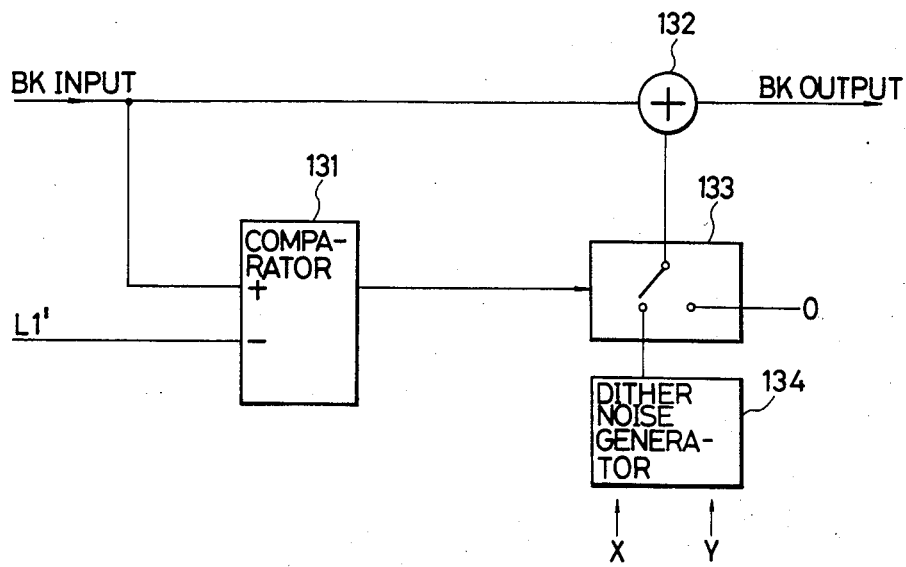
FIG.5
FIG.6
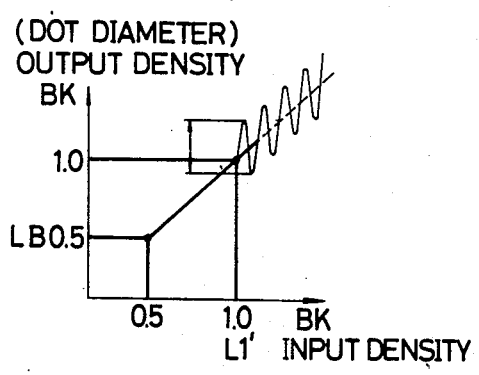

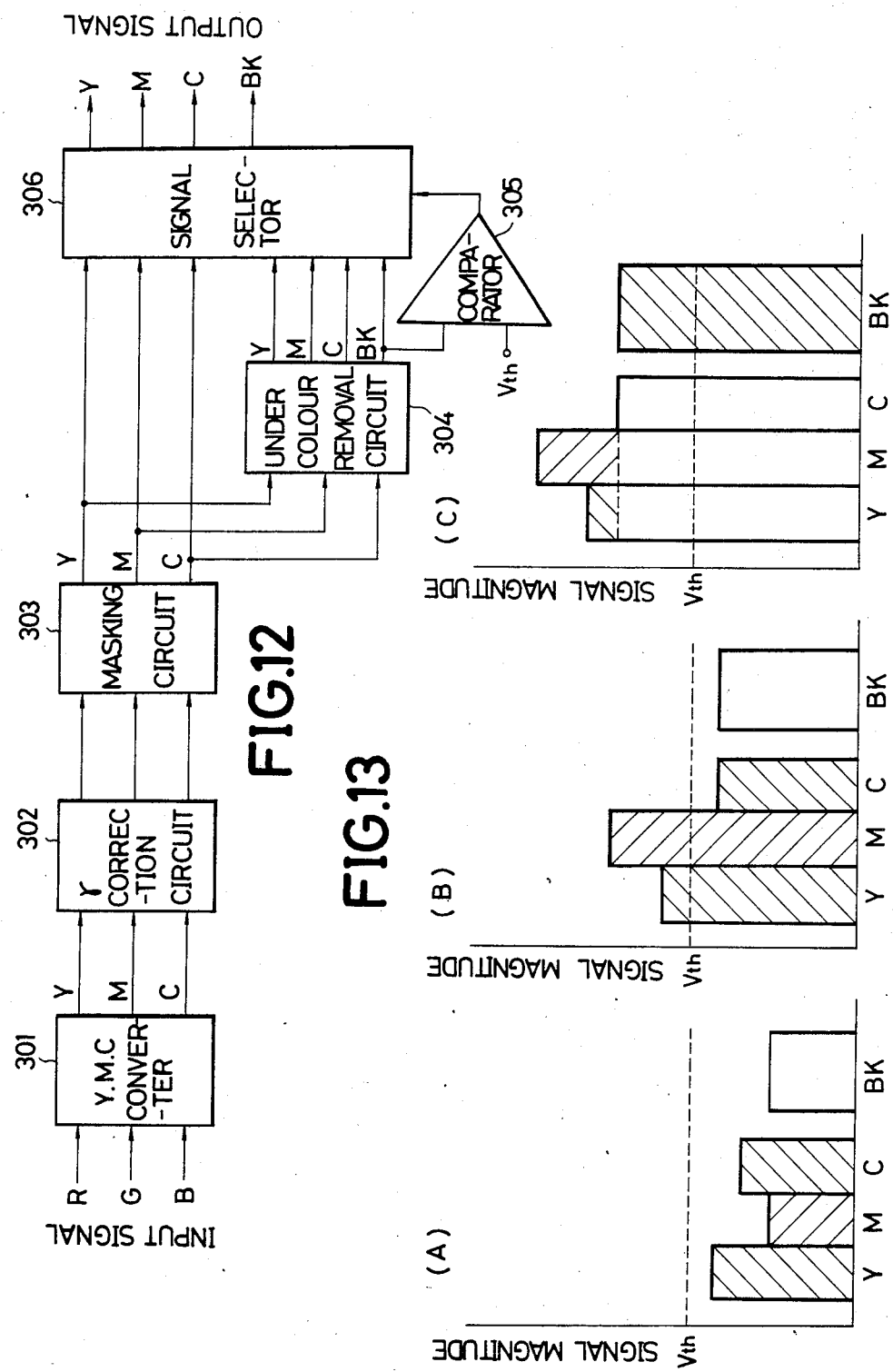

COLOR IMAGE PICTURE FORMING PROCESS AND APPARATUS WHICH IMPROVES THE QUALITY OF THE BLACK PORTIONS OF THE PICTURE

BACKGROUND OF THE INVENTION

1. Field of the Invention

The present invention relates to a color image picture forming process and apparatus for forming a color image picture using coloring materials (colorants) of four colors including three primary colors of cyan, magenta and yellow or the like, and black and by adhering each colorant on a paper corresponding to one picture element (pixel).

In more particular, the present invention relates to a method of using the colorant black.

2. Description of the Prior Art

In ink-jet printers and the like, it is theoretically possible to reproduce black using three primary colors of cyan, magenta and yellow as a subtractive mixture; however, it is in practice impossible to express black with high density due to the blot by overlapping the inks of three colors.

Therefore, in general, black is further added to the three colors of cyan, magenta and yellow to obtain four colors and the black component (colorless component) is replaced by black, thereby constituting an image picture.

For example, assuming that the densities of cyan, magenta and yellow of a certain pixel are c, m and y, respectively, there is adopted such a method that the density of the black ink is determined such that, for example, BK=min (y, m, c) and in the case where this black component level BK is larger than a certain constant threshold, the use of the black ink is started.

In such a method, since the lowest reflection optical density which can be expressed by monochrome of black is fairly high, the use of the black ink is suddenly started from a density point more than a certain density. Namely, the use of black is suddenly started from a density point more than a certain density in the portion which was a smooth shadow portion in the original image picture. Consequently, an unnatural false contour or "pseudo profile" would have been produced.

In addition, since qualities of the colorants to be used such as inks, toner, etc. generally increase in the high-density portion of an image picture, the gradient information in the image picture will be lost due to the flow and blot of the inks, causing picture quality to deteriorate.

Particularly in case of a color image picture, even if under color removal is performed, since a high quantity of ink is still adhered in the high-density portion, this also causes picture quality to deteriorate.

For instance, assuming that a human face is the intermediate gradient image picture, since black hair is expressed as substantially the high-density portion, a flat image will be obtained, so that the impression of hair is lost and there occurs a problem of deterioration of quality of the whole image picture.

On the other hand, in color printers, black is expressed using the black colorant in addition to the three primary colors as described above. However, the contrast of the whole image picture is determined depending upon the highest OD value (reflection optical density) to be expressed by the black colorant; therefore, if one desires to express from the low OD value to the high OD value by the black colorant, it is difficult to express high OD values and the contrast of the image picture is not satisfactorily derived.

SUMMARY OF THE INVENTION

It is an object of the present invention to provide color image picture forming process and apparatus which can express the smooth shadow portion in consideration of the above-mentioned points and, more particularly, to provide a method of using the black colorant.

In addition, another object of the present invention is to provide color image picture forming process and apparatus which can form an image picture having a good quality feeling in the high-density portion.

Still another object of the present invention is to provide color image picture forming process and apparatus which can raise the contrast of the whole image picture to be obtained, thereby enabling an image picture with high quality to be derived.

Briefly, this is achieved by expressing black with the combination of cyan, magenta and yellow colorants when the black component of a color picture data is smaller than a predetermined value and with the three colorant combination and black colorant when the black component is larger than the predetermined value.

The above and other objects, features and advantages of the present invention will be apparent from the following detailed description in conjunction with the accompanying drawings.

BRIEF DESCRIPTION OF THE DRAWINGS

FIG. 4 shows a detailed circuit diagram in a noise superimposing unit of FIG. 3;

FIG. 5 is a diagram showing one example of a dither pattern;

FIG. 6 shows an input/output characteristic diagram of the black component according to the present embodiment;

FIG. 12 shows a block diagram of a fourth embodiment of the image processor in the color video printer of FIG. 1;

FIGS. 13A, 13B and 13C are explanatory diagrams showing the various conditions of an output signal in the image processor of FIG. 12;

DETAILED DESCRIPTION OF THE PREFERRED EMBODIMENTS

Figure 1:
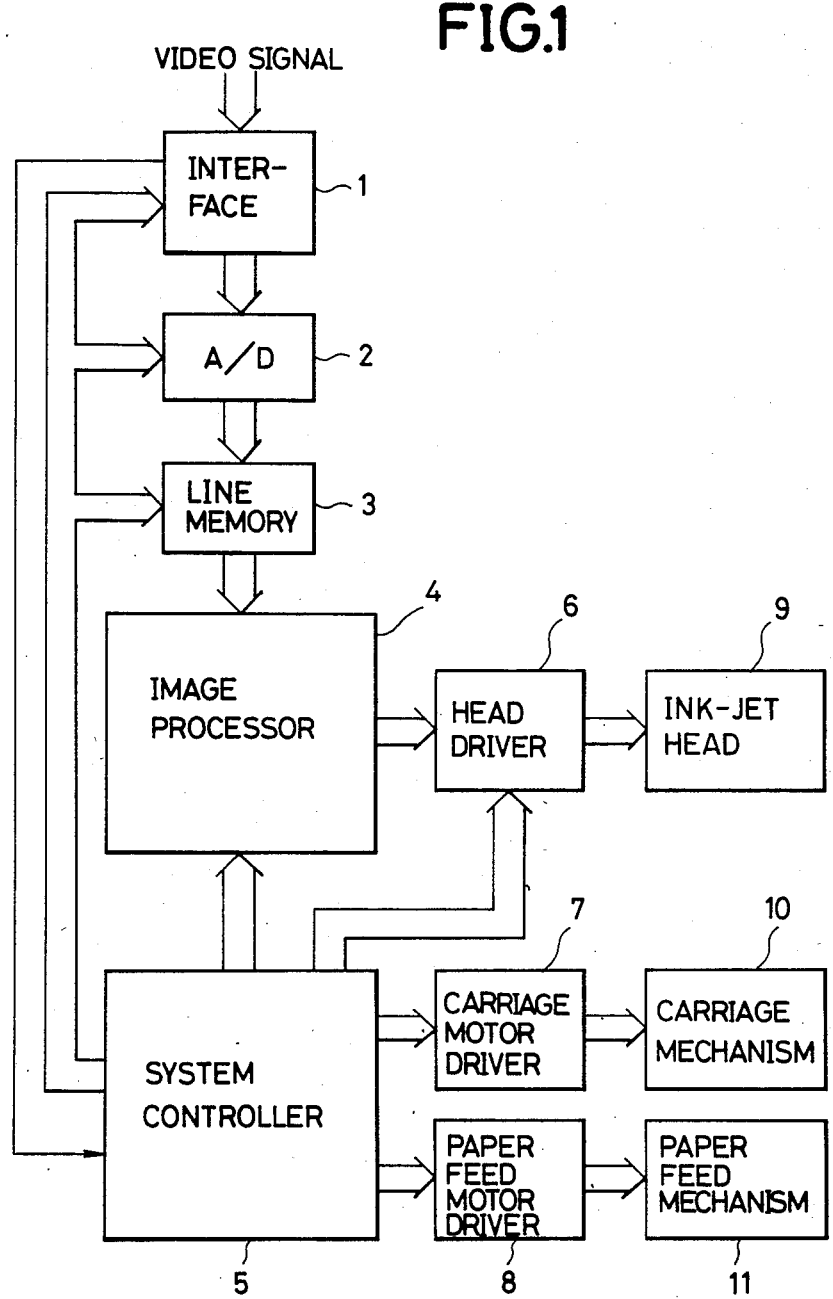
FIG. 1 shows a control block diagram of a video printer to which the present invention can be applied.

FIG. 1 shows a block diagram of the signal processing in the case where the present invention was applied to an ink-jet printer.

A composite video signal including a video signal of a projection image, for example, each chrominance signal of R, G and B and a synchronizing signal is inputted to a video signal interface 1. The signal is synchronized in this interface and is sampled and held in a sample and hold circuit. This signal is introduced to an A/D converter 2 at the next stage and gradient signals of image signals R, G and B are converted into digital signals. The digital signals of the number corresponding to a proper number of lines among these digital signals are stored in a next line memory 3. The lines are generally set vertically, but it may be of course possible to set them horizontally. The data in this line memory is then subjected to processings such as color conversion, under color removal, masking processing, etc. for every picture element (pixel) by an image processor 4, so that it is generally converted into cyan, magenta, yellow, and black signals and these signals are further converted into the voltage values to be applied to each head and are inputted to a head driver 6. The driver 6 applies the analog voltages responsive to the applied voltages to an ink-jet head 9, so that the head 9 discharges a quantity of ink corresponding to its applied voltage.

On the other hand, a head drive signal, a carriage motor drive signal and a paper feed signal are generated at timings corresponding to the input image signal by a system controller 5 for controlling the sequence of the printer and these signals are respectively supplied to the head driver 6, a carriage motor driver 7 and a paper feed motor driver 8. Thus, the ink-jet head 9, a carriage motor and its mechanism 10, and a paper feed motor and its mechanism 11 are controlled at predetermined timings, thereby printing the reproduction image picture of the input video signal on a recording medium.

Figure 2:
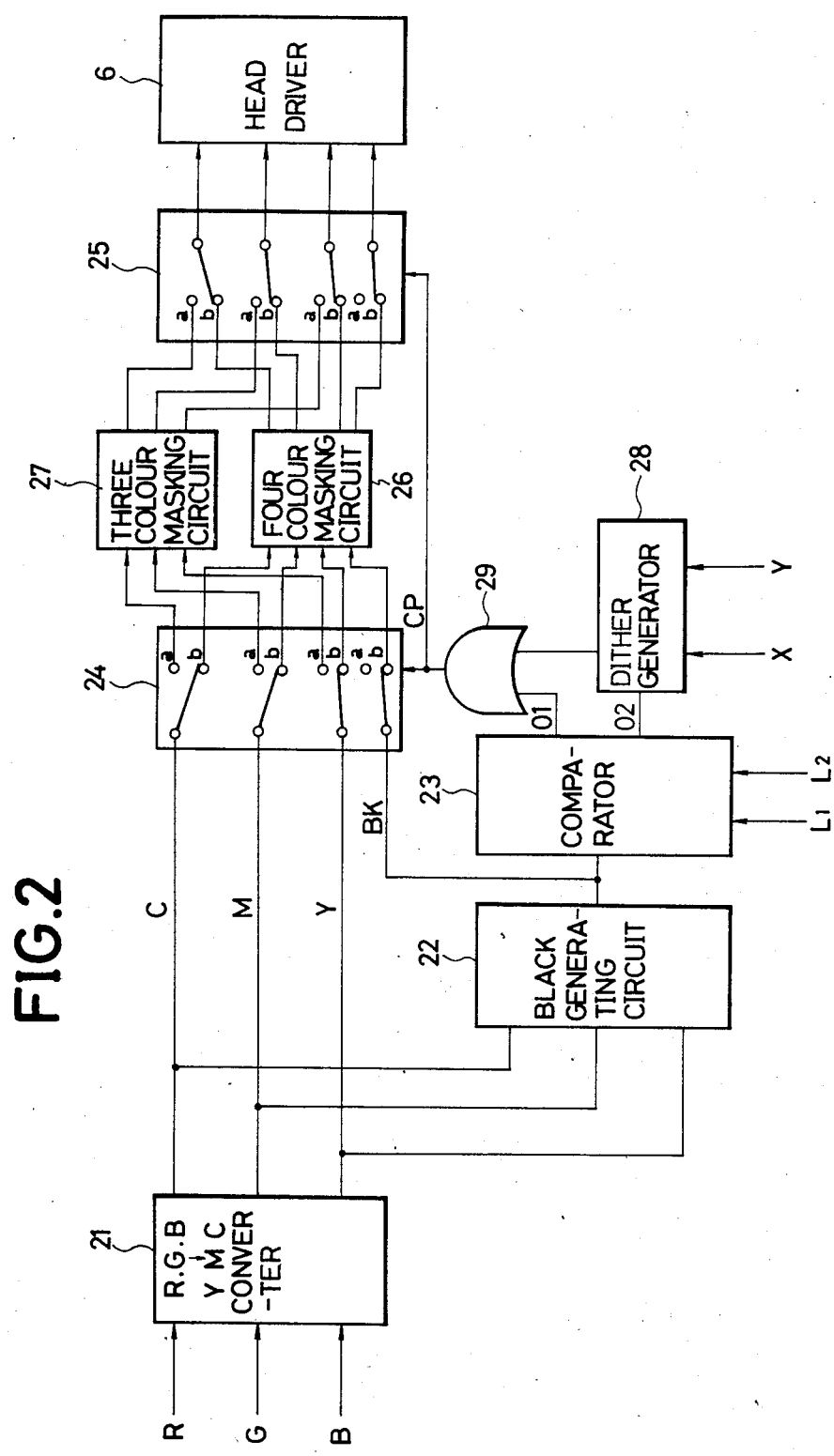
FIG. 2 shows a detailed circuit diagram of a first embodiment of an image processor 4 of FIG. 1.

FIG. 2 shows a detailed block diagram of a first embodiment of the image processor 4 of FIG. 1.

In the diagram, a reference numeral 21 denotes a converter for converting the RGB signals into the YMC signals; 22 indicates a black generating circuit for extracting the black component from the densities of YMC; 23 is a comparator; 24 and 25 switching circuits; 26 a four-color masking circuit of Y, M, C and BK; 27 a three-color masking circuit of Y, M and C; 28 a dither generator; and 29 an OR circuit.

The respective R, G and B chrominance signals of a pixel to be plotted are logarithm-converted by the converter 21 and are converted into the chrominance signals of Y, M and C. If necessary, the γ conversion may be performed here. The black component BK is extracted from the lowest densities of Y, M and C. The black component BK is inputted to the switching circuit 24 and to the comparator 23. This black component BK is compared with threshold levels L1 and L2 which were set to be L1<L2 by the comparator 23. When L2<BK, an output 01 becomes high level (hereinbelow, referred to as "H"), while when L1<BK<L2, an output 02 becomes "H".

When the output signal 01 becomes "H", an output signal CP of the OR circuit 29 becomes "H", so that switches in the switching circuits 24 and 25 are switched to the sides of b, thereby allowing the four-color masking to be performed in the four-color masking circuit 26. Namely, in the case where the black component is high, the four-color masking is carried out and the black ink is always used.

Then, in the case where the output signal 02 is "H", the dither generator 28 is enabled and it outputs the level signals of "H" and "L" alternately or at random to the OR circuit 29 in accordance with changes of a main scanning clock X and a sub-scanning clock Y which represent the position of the dot to be plotted. Therefore, the signal CP repeats "H" and "L" alternately or at random, thereby selecting the three-color masking circuit 27 and the four-color masking circuit 26 alternately or at random. That is, the black ink is used or not used at a mid-density level.

When both output signals 01 and 02 are together "L", the switches in the switching circuits 24 and 25 are switched to the sides of a, so that the three-color masking is performed by the three-color masking circuit 27. Namely, in the case of the low black component BK, the black ink is never used.

The above-mentioned relations will be shown in the following table.

| Level of BK | |
|---|---|
| BK ≦ L1 | 3 colors |
| L1 < BK < L2 | 3-color/4-color overlap |
| L2 ≦ BK | 4 colors |

In addition, the coefficients of the three-color masking and four-color masking can be easily obtained using, for example, a method of least squares from the data of which the inks were actually color-mixed, respectively. Since there is the black component BK, the result of the four-color masking is ordinarily such that y, m and c are remarkably reduced and a quantity of the whole ink is extremely decreased, causing the resolution power of an image picture to be improved.

On the other hand, as a method of detecting a density of the black ink from each density of y, m and c, for example, it is determined in such a manner that $$BK = \alpha \min(y, m, c) + \beta$$

It is desirable that α is in a range of 0.5 to 1.5 and β is in a range of −0.5 to 0.5. In case of using the diether of n×n, it is desirable that the values of the thresholds L1 and L2 are set to be $L2 - L1 \geqq 0.02 \, n^2$.

The present embodiment can be also performed by software using, for example, a microcomputer. In case of constituting the present embodiment by a hardware, for instance, it is also possible that the inputs R, G and B are resolved into five bits and that the arithmetic results which were obtained using the method of the present invention for each case are memorized in an ROM as a form of a table.

As described above, it is possible to remarkably reduce the pseudo profile portion to be produced as a result of that the thick black ink was suddenly plotted at the portion which was inherently the smooth shadow portion, thereby enabling an image picture with high quality to be obtained.

The above description related to the reproduction of black at the mid-density portion. The reproduction of black at the high-density portion will now be described.

Figure 3:
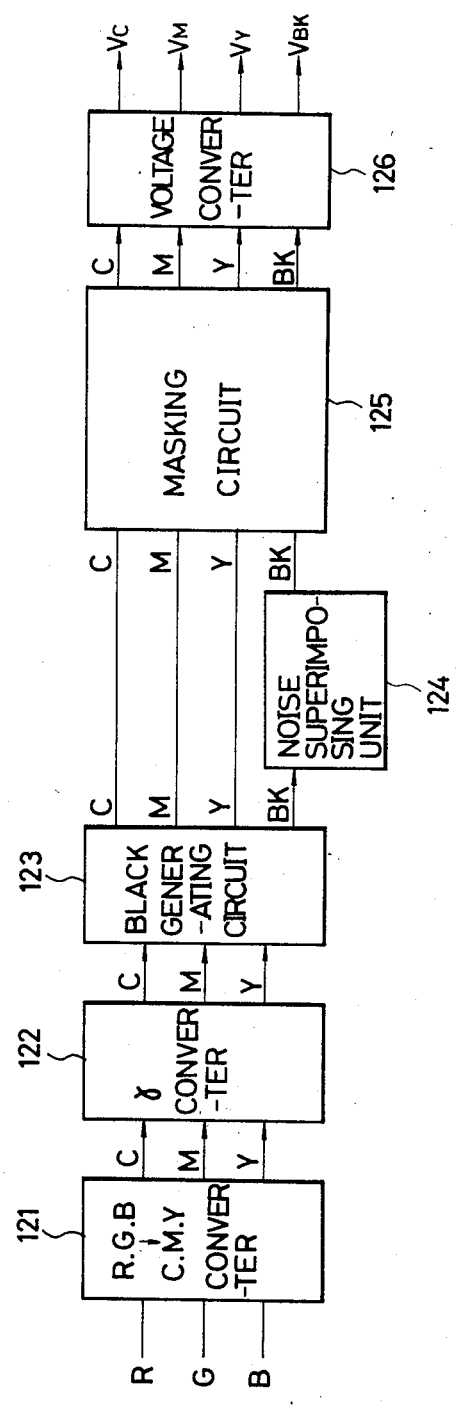
FIG. 3 shows a detailed circuit diagram of a second embodiment of the image processor 4 of FIG. 1.

FIG. 3 shows a detailed block diagram of a second embodiment of the image processor 4 of FIG. 1.

The R, G and B signals are converted into the density signals C, M and Y of cyan, magenta and yellow by a CMY converter 121. After these signals were then $\gamma$ converted by a $\gamma$ converter 122, the density BK of black is determined by a black generating circuit 123. The density BK of black is determined in such a manner that, e.g., BK=$\alpha$min (C, M, Y)$^\circ\beta$. $\alpha$ and $\beta$ are set to be, for example, $\alpha=1$ and $\beta=0$, and min (C, M, Y) indicates the lowest density among the densities of C, M and Y. When BK is larger than a certain threshold $L_B$, black is also used. On the contrary, when BK is smaller, black is not used but only the other three colors are used. In case of using black, the black component is subtracted from each value of C, M and Y, thereby to obtain each density of cyan, magenta and yellow. Thereafter, the color correction is performed in a masking circuit unit 125 and the respective density signals are converted into analog voltage values $V_C$, $V_M$, $V_Y$, and $V_{BK}$ to drive each head by a voltage converter 126 and these values are transferred to the head driver 6.

Next, the operation of a noise superimposing unit 124 will be described. In this unit, the black density BK which was determined in the black generating circuit 123 is compared with a predetermined threshold L1', and if L1'<BK, the noise to be caused due to the dither is superimposed into BK and this total value is outputted as a new BK value. If L1'>BK, the value of BK is outputted as it is.

These signals BK, C, M, and Y obtained in this way are inputted to the masking circuit unit 125 and are subjected to the color correction, thereafter they are outputted to the head driver 6.

FIG. 4 is a block diagram showing a method of superimposing the noise.

The BK input is compared with the threshold L1' by a comparator 131. When BK>L1', a switch 133 is switched to the left side, so that the dither noise is superimposed to BK by an adder 132. When BK≦L1', the switch 133 is switched to the right side and 0 is added, so that the BK input is outputted as it is.

The main scanning direction X and the subscanning direction Y are referred in a dither noise generator 134, thereby generating the corresponding dither pattern component.

For example, in case of using a dither matrix of 2×2 as shown in FIG. 5, the component corresponding to the cell (mod$_2$X, mod$_2$Y) in the matrix is outputted as the dither noise. The power of the dither, i.e., the difference $D_p$ between the maximum value and the minimum value in the component of the dither matrix is determined in consideration of the threshold L1'. A value of $D_p$ is preferably set to be 1/50 to ½ of the threshold level L1' of the reflection optical density.

FIG. 6 is a diagram showing the input/output characteristic of the black component according to the present embodiment. When the input level of the black component is low, the output density linearly changes. Namely, a dot diameter of the black ink also linearly changes, so that satisfactory gradient is expressed. However, when the input level of the black component exceeds the predetermined level L1', the high and low output densities appear alternately. Tht is to say, the dot diameter of the black ink becomes large and small. Therefore, an output image picture does not perfectly become black.

In the case, the lowest OD value to be expressed by the black ink is set to be $L_B$=0.5, L1'=1.0, and $D_p$=0.20. A value of L1' is preferably set to be 50% or more of the highest OD value which can be reproduced by the black ink.

The present embodiment can be also realized by software using a microcomputer; in addition, it can be also constituted by a hardware in such a manner that R, G and B are preliminarily divided into the steps each consisting of for example 5 bits and the results of C, M, Y, and BK for each group of R, G and B are stored as a form of a table in an ROM. Furthermore, as in this embodiment, a random number generator may be also used in addition to use the dither pattern as the noise.

On the other hand, although the ink-jet printer has been used as the printer in this embodiment, any printer which can change the output density may be used and an electrophotographic printer, a thermal transfer copying printer, and other various printers can be used.

As described above, by superimposing the dither noise or the like to BK having a density of not smaller than a certain constant threshold L1', the portions having large and small quantities of colorants of the inks or the like are made in the high-density portion at random or at a predetermined rate, thereby enabling the gradient to be seemingly expressed even in the high-density portion to the eye. Thus, it is possible to obtain a very high-grade picture quality as an impression of an image picture.

Although this method does not provide a high fidelity reproduction in a strict sense of the word, it is possible to obtain good picture quality which gives a favorable impression upon the human eye.

Particularly, for expressing black hair, the moderate noise at the black portion apparently gives an impression as if it reproduced the information of the hair, thereby enabling picture quality to be improved.

The above description related to a method of reproducing black at the high-density portion. Next, it will be described a method of reproducing an image picture with high contrast using the black colorant.

Figure 7:
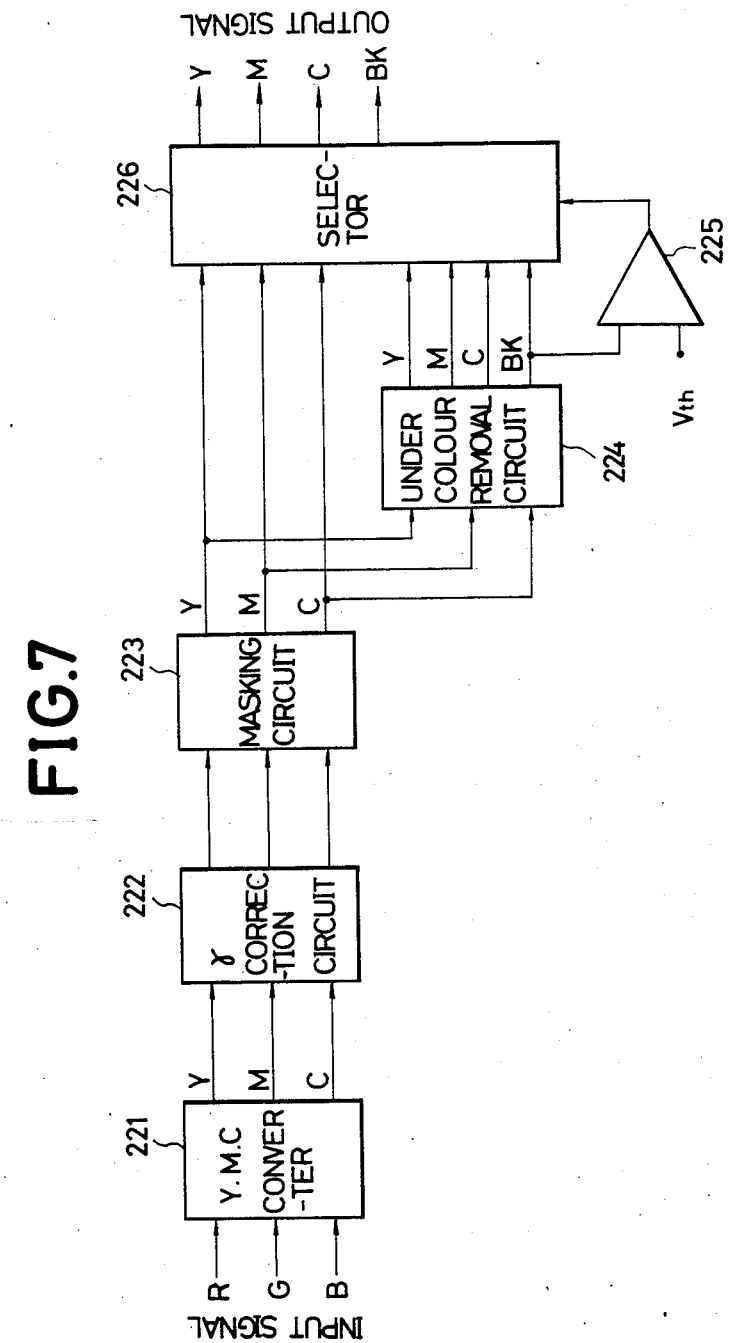
FIG. 7 shows a detailed block diagram of a third embodiment of the image processor 4 of FIG. 1.

FIG. 7 shows a block diagram of a third embodiment of the image processor 4 of FIG. 1, in which the input R, G and B signals are processed by a YMC converter 221, a $\gamma$ correction circuit 222 and a masking circuit 223 and then are inputted to an under color removal circuit 224 and a selector 226. The black component signal BK from the under color removal circuit 224 is compared with a predetermined threshold $V_{th}$ by a comparator 225. Either the signal from the masking circuit 223 or the signal from the under color removal circuit 224 is selected by the selector 226 and is outputted as an output signal therefrom. Therefore, when the black component BK signal is smaller than $V_{th}$, the BK signal is not outputted, so that the black ink is not printed. In addition, the Y, M and C signals from the masking circuit 223 are outputted as they are.

In the case where the BK signal is larger than the threshold $V_{th}$, the output of the under color removal circuit 224 is applied to the head, so that the black ink is printed.

Figures 8, 9, 10:
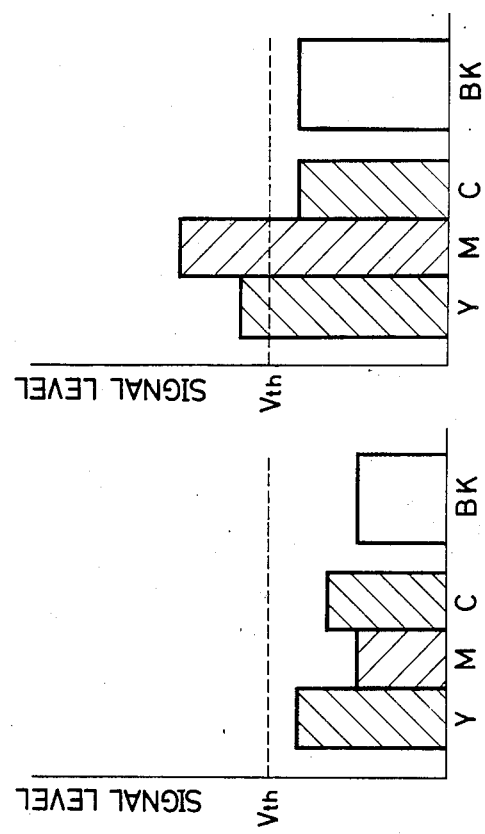
FIGS. 8 to 10 show diagrams representing signal levels after the masking processing.

FIGS. 8 to 10 show examples representing the output signals, in which a height of the hatched portion indicates a magnitude of the output signal. In FIG. 8, the Y, M and C signals from the masking circuit are outputted as they are since they are smaller than $V_{th}$. In FIG. 9 also, the Y, M and C signals are outputted as they are since the C signal is smaller than $V_{th}$ and the BK signal whose under color was removed is also smaller than $V_{th}$. However, in FIG. 10, since all of the Y, M and C signals are larger than $V_{th}$, the Y and M signals which were processed by the under color removal circuit and the BK signal are outputted.

Figure 11:
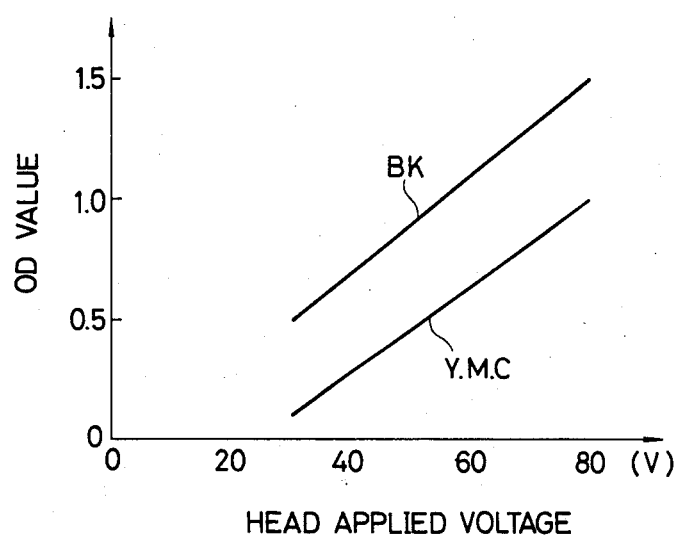
FIG. 11 is a diagram showing the relation between the applied voltage to a printer head and the reflection optical density with respect to yellow, magenta, cyana, and black.

In this way, when the level of BK is low, the black component is expressed by yellow, magenta and cyan. The value of the reflection optical density OD value to be expressed using black ink to the applied voltage of the printer head is set to be larger than the OD value to be expressed by yellow, magenta and cyan. For example, for the yellow, magenta and cyan inks, the dye concentration is 2%, while it is set to 4% for the black ink. These relations are shown in FIG. 11. For instance, although the OD value to be obtained by overlapping the respective inks by driving the yellow, magenta and cyan ink heads at 80 V is about 1.0, the OD value of about 1.5 is obtained by driving the black ink head at 80 V, thereby enabling a high-density image picture. Although it is considered that a high OD value is obtained by raising the dye concentrations of the yellow, magenta and cyan inks, the inks blot and in the case where the ink having a single density was used with respect to each ink, the lowest OD value would have been raised, so that the thin portion of an image picture cannot be expressed.

As in this embodiment, by using the low-concentration inks of yellow, magenta and cyan and the high-concentration black ink, it is possible to satisfactorily express from the thin portion to the thick portion of an image picture and thereby to obtain an image picture with high contrast.

In the above-described embodiment, quantities of inks to be used can be reduced by replacing the common portions of yellow, magenta and cyan which are not larger than the preset value $V_{th}$ by the low-density black.

In FIG. 7, there is also a method of using the masking circuit 223 as the final stage and performing the masking processing using the four colors of yellow, magenta, cyan, and black.

In addition, for example in electrophotographic printers, the present embodiment can be realized using a high-density toner with regard to only black, while in thermal transfer copying printers, it can be realized by using the black ink ribbon having a higher density than those of the ink ribbons of the other colors.

As described above, according to the third embodiment of the present invention, it is possible to print thicker black by setting the highest OD value to be expressed by the black ink to be higher than the highest OD values to be expressed by the other colorants.

Therefore, it is possible to sufficiently cover from the low density to the high density and the image picture contrast can be raised, thereby enabling picture quality to be improved.

FIG. 12 is a block diagram showing a fourth embodiment of the image processor 4 in the color ink-jet printer of FIG. 1. The input R, G and B signals are processed by a YMC converter 301, a γ correction circuit 302 and a masking circuit 303 and then are inputted to an under color removal circuit 304 and to a signal selector 306. A reference numeral 305 denotes a comparator, which compares the BK signal from the under color removal circuit 304 with the predetermined threshold $V_{th}$. Either one of the signal from the masking circuit 303 and the signal from the under color removal circuit 304 is selected by the signal selector 306 and is outputted as the output signal.

To further describe this state, when the BK signal is smaller than the threshold $V_{th}$, the BK signal is not outputted and the Y, M and C signals from the masking circuit 303 are outputted as they are. FIGS. 13A, 13B and 13C show three kinds of examples of the output signals, in which a height of the hatched portion represents a magnitude of the output signal. In FIGS. 13A and 13B, at least one of the Y, M and C signals is smaller than the threshold $V_{th}$ and in these cases, the Y, M and C signals are outputted as they are. On the contrary, in FIG. 13C, all of the Y, M and C signals are larger than the threshold $V_{th}$ and in this case, the Y and M signals which were processed by the under color removal circuit 304 and the BK signal are outputted.

In this embodiment, since an analog printing method is used, a large dot is thickly printed and a small dot is thinly printed for one pixel. To make the print density thick, it is necessary to enlarge a dot diameter and one means for realizing such a purpose is to enhance the orifice of the printer head. For example, when an image is formed with a picture element density of 6.7 pel (picture element/mm), orifice bores of the ink heads regarding the three colors of Y, M and C are set into 40 μm, while only that of BK is set into 50 μm.

Figure 14:
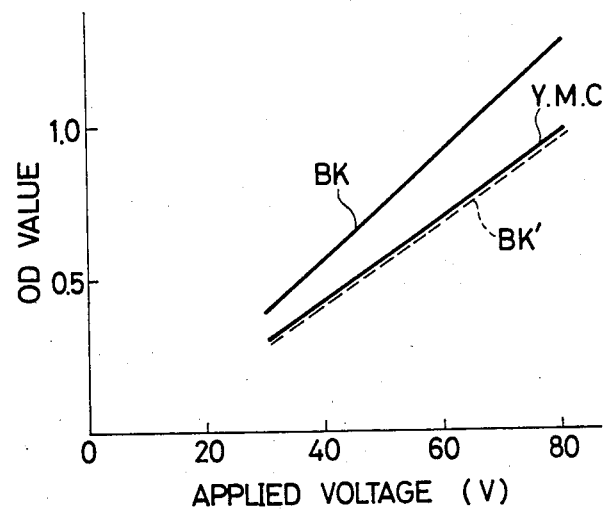
FIG. 14 is a diagram showing the relation between the applied voltage to a printer head and the reflection optical density (OD value) with respect to the yellow, magenta, cyan, and black signals when a larger orifice is used for black ink.

FIG. 14 shows the relation between the reflection optical density (OD value) to the applied voltage (V) to the ink head with respect to the Y, M, C, and BK signals. The data was obtained in the case where each dye concentration of the inks of four colors is set to 2%. When an orifice bore of the head for the BK signal is set to be equal to those of the other three colors, the OD value of the BK signal is equal to the OD values of the signals indicative of the other three colors as indicated by the broken line BK′. However, in this condition, the sufficient contrast cannot be obtained as described before. Therefore, as described above, when an orifice bore of the head for the BK signal is enlarged by for example 25% larger than those of the other three colors and is set into 50 μm, only the OD value of the BK signal is larger by 0.1 to 0.3 than the OD values of the other three colors, so that the BK signal can be more thickly printed. In FIG. 13, a wide transverse width of BK denotes that its dot diameter is set to be larger than those of the other three colors.

The present invention intends to improve such a point that when dot diameters which are formed by the print heads with regard to the respective Y, M, C, and BK signals are set to be equal, a reproduction range of the BK signal becomes narrow and the sufficient contrast cannot be obtained, and intends to raise the contrast and to improve picture quality by more thickly printing the black ink by making a dot diameter to be formed by the print head for the BK signal larger than those for the signals of the other three colors as described above.

Figure 15:
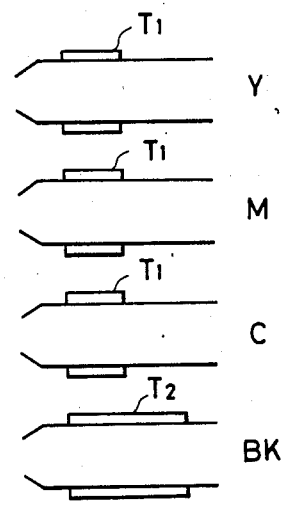
FIG. 15 is a diagrammatical view showing the main part of other embodiments of the color video printer of the present invention.

Although a dot diameter has been enhanced by enlarging an orifice diameter of the head for only the BK signal in the fourth embodiment described above, a similar effect to that to be obtained in the above-mentioned method can be obtained by the following method as another means as shown in FIG. 15; i.e., a length of a mechanical/electric converting element (for example, piezo-electric converting element) $T_2$ of the head for the BK signal is set to be longer than lengths of mechanical/electric converting elements $T_1$ of the heads for the signals of the other colors; or an applied voltage to the head for the BK signal is set to be higher than those to the heads for the signals of the other colors by means of for example a level shift circuit.

As described above, according to the fourth embodiment of the present invention, since a dot diameter by the head for black among the print heads for the four colors of yellow, magenta, cyan, and black has been set to be larger than those of the other heads, only the black ink is printed with a higher density than the other colors for the same original signal levels, thereby obtaining the good contrast and enabling picture quality to be improved.

As described above, the use of the method of reproducing the black component (colorless component) of the present invention allows picture quality of the whole color image picture to be extremely improved.

In addition, the present invention is not limited to the above-described embodiments, but many variations and modifications are possible within the scope of the appended claims. Although the present invention has been described in particular with respect to an example of the ink-jet printer, the invention can be applied to any printers which form a color image picture using the dots of three primary colors and black; for example, an elctrophotographic printer, a thermal printer, a thermal transfer copying printer, an electrostatic printer, etc.

What is claimed is:

1. A color image picture forming process comprising the steps of:
   forming dots of colorants of four colors of cyan, magenta, yellow and black;
   a first expression step of expressing black in the picture using the cyan, magenta and yellow colorants;
   a second expression step of expressing black in the picture using the black colorant;
   selecting said first expression step when a black component of color image picture data is smaller than a predetermined value; and
   selecting said first and second expression steps in a mutually exclusive alternating manner when the black component is larger than the predetermined value.

2. A color image picture forming process according to claim 1, further comprising the step of selecting a second predetermined value which is larger than the first-mentioned predetermined value and selecting only said second expression step when the black component is larger than the second predetermined value.

3. A color image picture forming process according to claim 1, wherein in said dot forming step, the dots of colorants of the respective colors are formed on a recording paper using ink-jet heads.

4. A color image picture forming process according to claim 3, further comprising the step of controlling the sizes of the dots.

5. A color image picture forming process according to claim 4, further comprising the step of controlling the amount of voltage applied to said ink-jet heads for controlling the sizes of the dots.

6. A color image picture forming process comprising the steps of:
   forming dots of colorants of four colors of cyan, magenta, yellow and black;
   a first expression step of expressing black in the picture using the cyan, magenta and yellow colorants;
   a second expression step of expressing black in the picture using the black colorant;
   selecting said first expression step when a black component of color image picture data is smaller than a predetermined value; and
   selecting said first and second expression steps alternately or at random when the black component is larger than the predetermined value.

7. A color image picture forming process according to claim 6 further comprising the step of selecting a second predetermined value which is larger than the first-mentioned predetermined value and selecting only said second expression step when the black component is larger than the second predetermined value.

8. A color image picture forming process according to claim 6, wherein in said dot forming step, the dots of colorants of the respective colors ae formed on a recording paper using ink-jet heads.

9. A color image picture forming process according to claim 8, further comprising the step of controlling the sizes of the dots.

10. A color image picture forming process according to claim 9, further comprising the step of controlling the amount of voltage applied to said ink jet heads for controlling the sizes of the dots.

11. A color image picture forming apparatus comprising:
    dot forming means for forming dots of colorants of four colors consisting of three primary colors and black;
    detecting means for obtaining a black component from color image picture data;
    first processing means for processing the color image picture data to express black in the picture by combining dots of the three primary colors;
    second processing means for processing the color image picture data to express black in the picture using black dots; and
    selecting means for selecting either one or both of said first and second processing means in accordance with the magnitude of the black component, wherein said selecting means selects both said first and second processing means in a mutually exclusive alternating manner when the black component is in a predetermined range.

12. A color image picture forming apparatus according to claim 11, wherein said selecting means selects only said first processing means when the black component is smaller than a lower limit of the predetermined range.

13. A color image picture forming apparatus according to claim 11, wherein said selecting means selects only said second processing means when the black component is larger than an upper limit of the predetermined range.

14. A color image picture forming apparatus according to claim 11, wherein said dot forming means includes ink-jet heads.

15. A color image picture forming apparatus according to claim 14, further comprising means for controlling the sizes of ink droplets discharged from said ink-jet heads.

16. A color image picture forming apparatus according to claim 11, further comprising means for controlling the sizes of the dots.

17. A color image picture forming apparatus according to claim 11, wherein said first processing means includes a three-color masking circuit.

18. A color image picture forming apparatus according to claim 11, wherein said second processing means includes a four-color masking circuit.

19. A color image picture forming apparatus according to claim 11, wherein the three primary colors are cyan, magenta and yellow.

20. A color image picture forming apparatus comprising:
   dot forming means for forming dots of colorants of four colors consisting of three primary colors and black;
   detecting means for obtaining a black component from color image picture data;
   first processing means for processing the color image picture data to express black in the picture by combining dots of the three primary colors;
   second processing means for processing the color image picture data to express black in the picture using black dots; and
   selecting means for selecting either one or both of said first and second processing means in accordance with the magnitude of the black component, wherein said selecting means selects both said first and second processing means in a mutually exclusive random manner when the black component is in a predetermined range.

21. A color image picture forming apparatus according to claim 20, wherein said selecting means includes a dither generator for the random selection of said first and second processing means.

22. A color image picture forming apparatus according to claim 20, wherein said selecting means selects only said first processing means when the black component is smaller than a lower limit of the predetermined range.

23. A color image picture forming apparatus according to claim 20, wherein said selecting means selects only said second processing means when the black component is larger than an upper limit of the predetermined range.

24. A color image picture forming apparatus according to claim 20, wherein said dot forming means includes ink-jet heads.

25. A color image picture forming apparatus according to claim 24, further comprising means for controlling the sizes of ink droplets discharged from said ink-jet heads.

26. A color image forming apparatus according to claim 20, further comprising means for controlling the sizes of the dots.

27. A color image picture forming apparatus according to claim 20, wherein said first processing means includes a three-color masking circuit.

28. A color image picture forming apparatus according to claim 20, wherein said second processing means includes a four-color masking circuit.

29. A color image picture forming apparatus according to claim 20, wherein the three primary colors are cyan, magenta and yellow.

30. A color image picture forming process comprising the steps of:
   forming dots of colorants consisting of three primary colors and black;
   a first expression step of expressing black in the picture by a combination of dots of the three primary colors;
   a second expression step of expressing black in the picture using black dots; and
   selecting either one or both of said first and second expression steps in accordance with the magnitude of a black component of color image picture data, wherein said first and second expression steps are both selected in a mutually exclusive alternating manner when the black component is in a predetermined range.

31. A color image picture forming process according to claim 30, wherein in said selecting step, only said first expression step is selected when said the component is smaller than a lower limit of the predetermined range.

32. A color image picture forming process according to claim 30, wherein in said selecting step, only said second expression step is selected when the black component is larger than an upper limit of the predetermined range.

33. A color image picture forming process according to claim 30, wherein in said dot forming step, the dots are formed by ink-jet heads.

34. A color image picture forming process comprising the steps of:
   forming dots of colorants consisting of three primary colors and black;
   a first expression step of expressing black in the picture by a combination of dots of the three primary colors;
   a second expression step of expressing black in the picture using black dots; and
   selecting either one or both of said first and second expression steps in accordance with the magnitude of a black component of color image picture data, wherein said first and second expression steps are both selected in a mutually exclusive random manner when the black component is in a predetermined range.

35. A color image picture forming process according to claim 34, wherein in said selecting step, only said first expression step is selected when the black component is smaller than a lower limit of the predetermined range.

36. A color image picture forming process according to claim 34, wherein in said selecting step, only said second expression step is selected when the black component is larger than an upper limit of the predetermined range.

37. A color image picture forming process according to claim 34, wherein in said dot forming step, the dots are formed by ink-jet heads.

38. A color image picture forming process comprising the steps of:
   forming dots of colorants of three primary colors and black;
   detecting a black component from color image picture data;
   combining the black component with a noise signal when the black component is larger than a first predetermined value, wherein the first predetermined value is 50% or more of the highest optical density expressible using the black colorant;
   expressing black in the picture using the three primary color colorants when the black component is smaller than a second predetermined value lower than the first predetermined value; and
   expressing black in the picture using the black colorant when the black component is larger than the second predetermined value.

39. A color image picture forming process according to claim 38, wherein in said combining step, the noise signal is superimposed on a signal representative of the black component.

40. A color image picture forming process according to claim 39, wherein in said combining step, said noise signal is generated in accordance with a predetermined dither pattern.

41. A color image picture forming process according to claim 38, wherein the three primary colors are cyan, magenta and yellow.

42. A color image picture forming process according to claim 38, wherein in said dot forming step, the dots of colorants of the respective colors are formed using ink-jet heads.

43. A color image picture forming process according to claim 38, further comprising the step of controlling the sizes of the dots in response to density levels of the color image picture data.

44. A color image picture forming apparatus comprising:
dot forming means for forming dots of colorants of three primary colors and black;
combining means for combining a dither signal with a black component signal obtained from color image picture data;
means for inhibiting the operation of said combining means when the level of the black component signal is smaller than a first predetermined value, wherein the first predetermined value is 50% or more of the highest optical density expressible using the black colorant;
first processing means for processing the color image data to express black in the picture by combining dots of the three primary colors when the black component is smaller than a second predetermined value lower than the first predetermined value; and
second processing means for processing the color image data to express black in the picture by using black dots when the black component is larger than the second predetermined value.

45. A color image picture forming apparatus according to claim 44, wherein the color image picture data comprises R, G and B signals.

46. A color image picture forming apparatus according to claim 45, further comprising detecting means for detecting the black component from the R, G and B signals.

47. A color image picture forming apparatus according to claim 44, wherein said combining means includes means for generating the dither signal.

48. A color image picture forming apparatus according to claim 47, wherein the amplitude of the dither signal changes regularly.

49. A color image picture forming apparatus according to claim 44, wherein said dot forming means includes ink-jet heads and said heads can vary the sizes of the dots.

50. A color image picture forming apparatus according to claim 44, further comprising means for controlling the sizes of the dots.

* * * * *

UNITED STATES PATENT AND TRADEMARK OFFICE
CERTIFICATE OF CORRECTION

PATENT NO. : 4,682,216

DATED : July 21, 1987

INVENTOR(S) : TAKASHI SASAKI, ET AL.

It is certified that error appears in the above-identified patent and that said Letters Patent is hereby corrected as shown below:

COLUMN 1

Line 46, "qualities" should read --quantities--.

COLUMN 2

Line 55, "cyana," should read --cyan,--.

COLUMN 4

Line 49, "diether" should read --dither-.

COLUMN 5

Line 9, "(C,M,Y)°ß." should read --(C,M,Y)ß.--.
    Line 65, "Tht" should read --That--.

COLUMN 8

Line 21, "enhance" should read --enlarge--.

COLUMN 9

Line 24, "elctro-" should read --electro- --.

UNITED STATES PATENT AND TRADEMARK OFFICE
CERTIFICATE OF CORRECTION

PATENT NO. : 4,682,216
DATED : July 21, 1987
INVENTOR(S) : TAKASHI SASAKI, ET AL.

It is certified that error appears in the above-identified patent and that said Letters Patent is hereby corrected as shown below:

COLUMN 10

Line 8, "6 further" should read --6, further--.
Line 15, "ae" should read --are--.
Line 22, "ink jet" should read --ink-jet--.

COLUMN 11

Line 48, "image forming" should read --image picture forming--.

COLUMN 12

Line 10, "said the" should read --the black--.

Signed and Sealed this

Twelfth Day of January, 1988

Attest:

DONALD J. QUIGG

Attesting Officer

Commissioner of Patents and Trademarks